United States Patent
Seo et al.

(10) Patent No.: US 9,308,511 B2
(45) Date of Patent: Apr. 12, 2016

(54) FABRICATING POROUS MATERIALS USING THIXOTROPIC GELS

(75) Inventors: Dong-Kyun Seo, Chandler, AZ (US); Alex Volosin, Tempe, AZ (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 943 days.

(21) Appl. No.: 13/499,167

(22) PCT Filed: Oct. 12, 2010

(86) PCT No.: PCT/US2010/052276
§ 371 (c)(1),
(2), (4) Date: May 22, 2012

(87) PCT Pub. No.: WO2011/046910
PCT Pub. Date: Apr. 21, 2011

(65) Prior Publication Data
US 2012/0235073 A1    Sep. 20, 2012

Related U.S. Application Data

(60) Provisional application No. 61/251,520, filed on Oct. 14, 2009.

(51) Int. Cl.
*B01F 3/00* (2006.01)
*H01F 1/00* (2006.01)
(Continued)

(52) U.S. Cl.
CPC .......... *B01J 13/0069* (2013.01); *B01J 13/0091* (2013.01); *B01J 20/0237* (2013.01);
(Continued)

(58) Field of Classification Search
None
See application file for complete search history.

(56) References Cited

U.S. PATENT DOCUMENTS 3,558,273 A   1/1971   Beck
4,374,232 A * 2/1983   Davis ............. C08F 291/00
                                                    525/243

(Continued)

FOREIGN PATENT DOCUMENTS

EP    0013497      7/1980
EP    454239      10/1991
(Continued)

OTHER PUBLICATIONS

Gresham, Dr. Robert M., contributing editor, "Viscosity: A fluid's resistance to flow", Tribology & Lubrication Technology, Nov. 2008, pp. 55-57 (available on www.stle.org).*

(Continued)

*Primary Examiner* — Mark Kopec
*Assistant Examiner* — Katie L Hammer
(74) *Attorney, Agent, or Firm* — Fish & Richardson P.C.

(57) ABSTRACT

Methods, apparatuses, and systems for fabricating porous materials using thixotropic gels. A shear force is applied to a thixotropic material causing the material to flow. Multiple components are added to the thixotropic material while applying the shear force causing the multiple components to be distributed in the material. The shear force is removed such that the static properties of the thixotropic material in the absence of the shear force retain a distribution of the multiple components in the thixotropic material to form a composite gel material that includes liquid within a network of interconnected solid particles that include the distributed plurality of components. The liquid in the composite gel material is removed to form a porous composite material.

20 Claims, 7 Drawing Sheets

(51) Int. Cl.

| | | |
|---|---|---|
| C09D 7/00 | (2006.01) | |
| H01B 1/00 | (2006.01) | |
| C08J 9/228 | (2006.01) | |
| B01J 13/00 | (2006.01) | |
| B01J 20/02 | (2006.01) | |
| B01J 20/04 | (2006.01) | |
| B01J 20/08 | (2006.01) | |
| B01J 20/20 | (2006.01) | |
| B01J 20/26 | (2006.01) | |
| B01J 20/28 | (2006.01) | |
| C04B 38/04 | (2006.01) | |
| C04B 38/06 | (2006.01) | |
| C04B 38/10 | (2006.01) | |
| C04B 111/00 | (2006.01) | |

(52) U.S. Cl.
CPC ........... *B01J20/043* (2013.01); *B01J 20/08* (2013.01); *B01J 20/20* (2013.01); *B01J 20/26* (2013.01); *B01J 20/28042* (2013.01); *B01J 20/28047* (2013.01); *B01J 20/28057* (2013.01); *B01J 20/28069* (2013.01); *C04B 38/04* (2013.01); *C04B 38/06* (2013.01); *C04B 38/10* (2013.01); *C04B 2111/00793* (2013.01)

(56) References Cited

U.S. PATENT DOCUMENTS

| | | | |
|---|---|---|---|
| 4,923,830 | A | 5/1990 | Everhart et al. |
| 5,045,511 | A | 9/1991 | Bosomworth et al. |
| 5,244,726 | A | 9/1993 | Laney et al. |
| 5,342,595 | A | 8/1994 | Davidovits et al. |
| 5,680,713 | A | 10/1997 | Forbert et al. |
| 5,725,836 | A | 3/1998 | Rouanet et al. |
| 6,131,305 | A | 10/2000 | Forbert et al. |
| 6,187,248 | B1 | 2/2001 | O'Neill et al. |
| 6,254,845 | B1 | 7/2001 | Ohashi et al. |
| 6,642,285 | B1 | 11/2003 | Bohner |
| 6,699,808 | B1 | 3/2004 | Schwertfeger et al. |
| 6,893,564 | B2 | 5/2005 | Mueller et al. |
| 7,297,321 | B2 | 11/2007 | Shpeizer et al. |
| 7,456,123 | B2 | 11/2008 | Wachter |
| 7,771,686 | B2 | 8/2010 | Sagoe-crentsil et al. |
| 8,557,214 | B2 | 10/2013 | Seo |
| 2001/0023296 | A1 | 9/2001 | Kato et al. |
| 2003/0108785 | A1 | 6/2003 | Wu et al. |
| 2004/0047798 | A1 | 3/2004 | Oh et al. |
| 2004/0258611 | A1* | 12/2004 | Barrow ............... B01J 37/0215 423/625 |
| 2005/0152829 | A1 | 7/2005 | Shpeizer et al. |
| 2005/0272593 | A1 | 12/2005 | Wachter |
| 2006/0057355 | A1 | 3/2006 | Suzuki et al. |
| 2006/0292054 | A1 | 12/2006 | Chaumonnot et al. |
| 2007/0003749 | A1* | 1/2007 | Asgari ....................... 428/304.4 |
| 2007/0009689 | A1 | 1/2007 | Murer |
| 2007/0048605 | A1 | 3/2007 | Pez et al. |
| 2007/0125271 | A1 | 6/2007 | Barlet-Gouedard et al. |
| 2007/0125272 | A1 | 6/2007 | Johnson |
| 2007/0128491 | A1 | 6/2007 | Chlsholm et al. |
| 2007/0259979 | A1 | 11/2007 | Lee |
| 2008/0028994 | A1 | 2/2008 | Barlet-Gouedard et al. |
| 2008/0028995 | A1 | 2/2008 | Barlet-Gouedard et al. |
| 2008/0067149 | A1 | 3/2008 | Piesslinger-Schweiger et al. |
| 2008/0090716 | A1 | 4/2008 | Cherepy et al. |
| 2008/0226893 | A1 | 9/2008 | Yang et al. |
| 2009/0026413 | A1 | 1/2009 | Patoux et al. |
| 2009/0041653 | A1 | 2/2009 | Hwang et al. |
| 2009/0256262 | A1 | 10/2009 | Farnworth et al. |
| 2009/0288557 | A1 | 11/2009 | Carati et al. |
| 2010/0104500 | A1 | 4/2010 | Holland |
| 2010/0222204 | A1 | 9/2010 | Frizon et al. |
| 2011/0092363 | A1 | 4/2011 | Seo et al. |
| 2012/0007020 | A1 | 1/2012 | Tarascon et al. |
| 2013/0055924 | A1 | 3/2013 | Seo et al. |
| 2013/0071737 | A1 | 3/2013 | Belharouak et al. |
| 2013/0137010 | A1 | 5/2013 | Aitken et al. |
| 2013/0153830 | A1 | 6/2013 | Seo et al. |
| 2014/0342156 | A1 | 11/2014 | Seo et al. |

FOREIGN PATENT DOCUMENTS

| | | |
|---|---|---|
| EP | 0497966 | 8/1992 |
| EP | 497466 | 8/1995 |
| EP | 1230008 | 8/2002 |
| EP | 2758355 | 7/2014 |
| JP | 2003206112 | 7/2003 |
| KR | 10-2001-0082910 | 8/2001 |
| KR | 10-2001-0107049 | 12/2001 |
| WO | WO9932218 | 7/1999 |
| WO | WO00128675 | 4/2001 |
| WO | WO2004018090 | 4/2004 |
| WO | WO2005019130 | 3/2005 |
| WO | WO2005054340 | 6/2005 |
| WO | WO2007064053 | 6/2007 |
| WO | WO2007129991 | 11/2007 |
| WO | WO2008124343 | 10/2008 |
| WO | WO2009050196 | 4/2009 |
| WO | WO2009140030 | 11/2009 |
| WO | WO2011046910 | 4/2011 |
| WO | WO2011068830 | 6/2011 |
| WO | WO2012018890 | 2/2012 |
| WO | WO2013044016 | 3/2013 |
| WO | WO2015006010 | 1/2015 |

OTHER PUBLICATIONS

Lee et al., "Recent Progress in the Synthesis of Porous Carbon Materials" Advanced Materials (Weinheim, Germany) (2006), 18(16), pp. 2073-2094.

Morris et al., "Silica Sol as a Nanoglue: Flexible Sythesis of Composite Aerogels" Science (Washington, D.C.) 1999, 284, (5414), pp. 622-624.

Pek et al., "A thixotropic nancomposite gel for three-dimensional cell culture" Nature Nanotechnology (2008), 3(11), pp. 671-675.

Baumann et al., "Synthesis of High-Surface-Area Alumina Aerogels without the Use of Alkoxide Precursors" Chemistry of Materials (2005), 17(2), pp. 395-401.

International Search Report and Written Opinion of International Application No. PCT/US2010/052276 mailed Jun. 27, 2011, 11 pages.

PCT Officer, Nora Linder, International Preliminary Report on Patentability of International Application No. PCT/US2010/052276 mailed Apr. 17, 2012, 7 pages.

Duxson et al. "Geopolymer technology: the current state of the art" J Mater Sci (2007) 42:2917-2933.

Komnitsas et al. "Geopolymerisation: A review and prospects for the minerals industry" Minerals Engineering 20 (2007), pp. 1261-1277.

Provis et al. "Do Geopolymers Actually Contain Nanocrystalline Zeolites? A Reexamination of Existing Results" Chem. Mater. 17, 2005, pp. 3075-3085.

Thomas et al. "Amorphous Zeolites" Angew. Chem. Inr. Ed. Engl. 19 (1980) No. 9, pp. 745-746.

Bell et al. "Nano- and Microporosity in Geopolymer Gels" Microsc Microanal 12 (Supp 2), 2006, pp. 552-553.

W. M. Kriven, "Inorganic Polysialates or 'Geopolymers'" American Ceramic Society Bulletin, May 2010, vol. 89, No. 4, pp. 31-34.

Kriven et al., "Microstructure and nanoporosity of as-set geopolymers" Ceramic Engineering and Science Proceedings 2007, vol. 27, Issue 2, pp. 491-503.

Joseph Davidovits, "Geopolymer Chemistry and Applications" Jun. 2008, Chapter 1, 16 pages.

Joseph Davidovits, Geopolymer Chemistry and Applications, 3rd Edition, Jul. 2011, pp. 1-33.

A. S. Wagh, "Chemically Bonded Phosphate Ceramics—A Novel Class of Geopolymers," Ceramic Transactions 2005, vol. 165, 12 pages.

Nedelec, J.M., "Sol-Gel Processing of Nanostructured Inorganic Scintillating Materials", Journal of Nanomaterials, vol. 2007, Article ID 36392, 8 pages, 2007.

(56) References Cited

OTHER PUBLICATIONS

Sivashanmugam, A. et al., "Glycine-Assisted Sol-Gel Combustion Synthesis and Characterization of Aluminum-Doped LiNiVO4 for Use in Lithium-Ion Batteries", Journal of the Electrochemical Society, vol. 153, No. 3, A497-A503, 2006.

Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.

Rolison, D. R. et al., "Electrically conductive oxide aerogels: new materials in electrochemistry", Journal of Materials Chemistry, vol. 11, pp. 963-980, 2001.

Zhang et al., "Mesostructured Forms of γ-Al2O3", J. Am. Chem. Soc. 124, pp. 1592-1593 (2002).

Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.

Kwak, Ja Hun et al., "Penta-coordinated Al3+ ions as preferential nucleation sites for BaO on γ-Al2O3: An ultra-highmagnetic field 27Al MAS NMR study", Journal of Catalysis, vol. 251, pp. 189-194, 2007.

Boettcher, Shannon W. et al., "Harnessing the Sol-Gel Process for the Assembly of Non-Silicate Mesostructured Oxide Materials", Accounts of Chemical Research, vol. 40, No. 9, pp. 784-792, 2007.

Zürner, Andreas et al., "Visualizing single-molecule diffusion in mesoporous materials", Nature, vol. 450, pp. 705-709, Nov. 29, 2007.

Iancu, Nora et al.,"Low-temperature synthetic method for size-controlled CdSe nanocrystals: utilization of boron selenide", Chem. Commun. 20, pp. 2298-2299, 2004.

Richards, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.

Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.

Villemin, Didier et al., "A one step process for grafting organic pendants on alumina via the reaction of alumina and phosphonate under microwave irradiation", Chem. Commun. 2001, pp. 2060-2061, 2001.

Laine et al. "Making Nanosized Oxide Powders From Precursors by Flame Spray Pyrolysis". Key Engr Matl. 159-160 pp. 17-24. 1999.

Schuyten et al. "A Novel Combustion Synthesis Preparation of CuO/ZnO/ZrO2/Pd for Oxidative Hydrogen Production from Methanol" Catal Lett (2008) 121:189-198.

Aguado-Serrano et al., "Silica/C composites prepared by the sol-gel method. Influence of the synthesis parameters on textural characteristics", Microporous and Mesoporous Materials. 74, pp. 111-119 (2004).

Aguado-Serrano et al., "Surface and catalytic properties of acid metal—carbons prepared by the sol—gel method", Applied Surface Science. 252, pp. 6075-6079 (2006).

Boffa et al., "Preparation of templated mesoporous silica membranes on macroporous a-alumina supports via direct coating of thixotropic polymeric sols", Microporous and Mesoporous Materials. 100, pp. 173-182 (2007).

Bruno et al., "Characterization of monolithic porous carbon prepared from resorcinol/formaldehyde gels with cationic surfactant", Colloids and Surfaces A: Physicochemical and Engineering Aspects. 358, pp. 13-30 (2010).

Capadona et al., "A versatile approach for the processing of polymer nanocomposites with self-assembled nanofibre templates", Nature Nanotechnology. 2, pp. 765-769 (2007).

Han et al., "The effect of silica template structure on the pore structure of mesoporous carbons", School of Chemical Engineering, Seoul National University, Carbon. 41, pp. 1049-1056 (2003).

Leventis et al., "One-Pot Synthesis of Interpenetrating Inorganic/Organic Networks of CuO/Resorcinol-Formaldehyde Aerogels: Nanostructured Energetic Materials", J. Am. Chem. Soc. 131, pp. 4576-4577 (2009).

Moreno-Castilla et al., "Synthesis and surface characteristics of silica- and alumina-carbon composite xerogels", Phys. Chem. Chem. Phys. 2, pp. 4818-4822 (2000).

Capadona et al., "X-Aerogel Processing Time Reduced by One-Pot Synthesis" http://www.grc.nasa.gov/WWW/RT/2006/RX/RX20P-capadonal.html, retrieved on Jul. 26, 2013 (last updated Dec. 14, 2007), 4 pages.

J. Aleman et al., "Definitions of Terms Relating to the Structure and Processing of Sols, Gels, Networks, and Inorganic-Organic Hybrid Materials," Pure and Applied Chemistry, vol. 79, No. 1, 2007, pp. 1801-1829.

Robert L. Burwell, Jr. "Manual of Symbols and Terminology for Physicochemical Quantities and Units—Appendix II. Definitions, Terminology and Symbols in Colloid and Surface Chemistry. Part II: Heterogeneous Catalysis," Pure and Applied Chemistry, vol. 46, 1976, pp. 71-90.

C. H. Christensen et al., "Mesoporous zeolite single crystal catalysts: Diffusion and catalysis in hierarchical zeolites" Catalysis Today 128, 2007, pp. 117-122.

N.-L. Michels et al., "Hierarchically Structured Zeolite Bodies: Assembling Micro-, Meso-, and Macroporosity Levels in Complex Materials with Enhanced Properties" Adv. Funct. Mater. 22, 2012, pp. 2509-2518.

D. P. Serrano et al., "Synthesis strategies in the search for hierarchical zeolites" Chemical Society Reviews 42, 2013, pp. 4004-4035.

L. Gueudré et al, "Diffusion in zeolites: is surface resistance a critical parameter?" Adsorption 16, 2010, pp. 17-27.

O. Cheung et al., "Adsorption kinetics for $CO_2$ on highly selective zeolites NaKA and nano-NaKA" Applied Energy 112, 2013, pp. 1326-1336.

A. L. Mayers et al., "Thermodynamics of Mixed-Gas Adsorption" A.I.Ch.E. Journal, vol. 11, No. 1, Jan. 1965, pp. 121-127.

O. Cheung et al., "Silicoaluminophosphates as $CO_2$ sorbents" Microporous Mesoporous Materials 156, 2012, pp. 90-96.

Le-Ping L et al, "Preparation phosphoric acid-based porous geopolymers," Applied Clay Science, vol. 50, No. 4, Dec. 1, 2010, pp. 600-603.

Hasan, F. A. et al., "Zeolite monoliths with hierarchical designed pore network structure: Synthesis and performance," Chemical Engineering Journal, Mar. 7, 2013 (Online), vol. 223, pp. 48-58.

Zhang, J. et al., "Synthesis of a self-supporting faujasite zeolite membrane using geopolymer gel for separation of alcohol/water mixture," Materials Letters, Nov. 9, 2013 (Online), vol. 116, pp. 167-170.

Akhtar, F. et al., "Colloidal processing and CO2 capture performance of sacrificially templated zeolite monoliths", Applied Energy, Jan. 13, 2012 (Online), vol. 97, pp. 289-296.

* cited by examiner

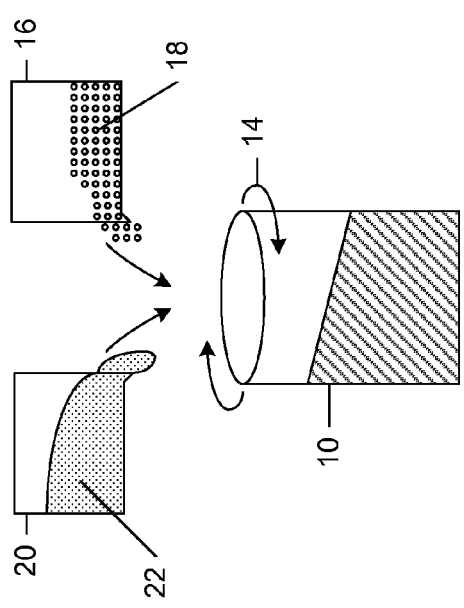
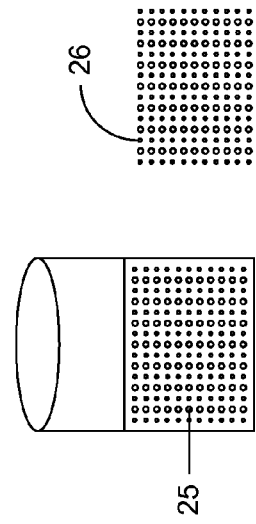
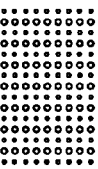
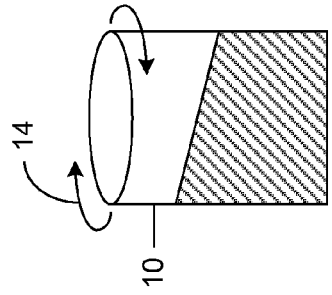
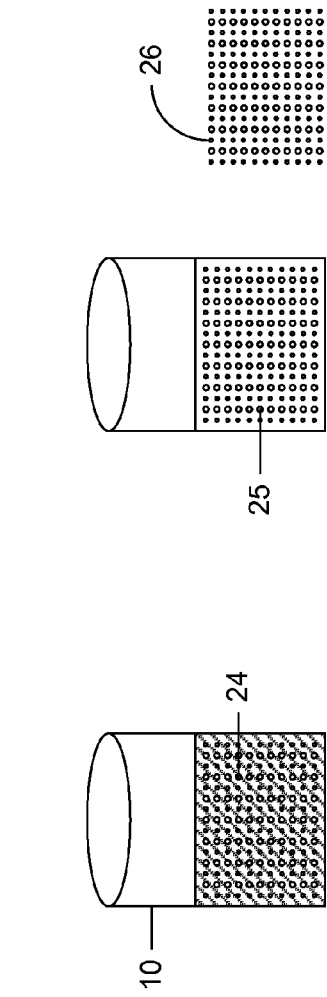
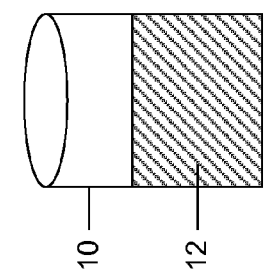
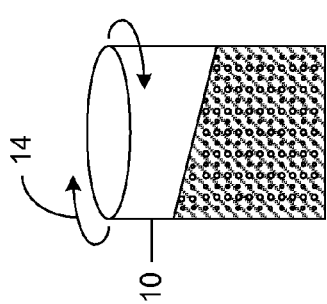

FABRICATING POROUS MATERIALS USING THIXOTROPIC GELS

CROSS-REFERENCE TO RELATED APPLICATIONS

This application is a U.S. National Phase Application of International Patent Application No. PCT/US2010/052276 filed Oct. 12, 2010, and entitled "Fabricating Porous Materials Using Thixotropic Gels," which claims priority to U.S. Application Ser. No. 61/251,520 filed on Oct. 14, 2009, and entitled "Fabricating Porous Materials Using Thixotropic Gels," both of which are incorporated herein by reference.

TECHNICAL FIELD

This application relates to porous composite materials.

BACKGROUND

Nanoporous materials find application in modern technologies including thermal insulation, gas storage, active membranes, fuel cells, solar cells, batteries, super capacitors, drug delivery, bio-implants, sensors, photonics, water purification, and the like, owing to their high surface area and porosity. Such materials can have a single component or multiple components. Porous carbon is an example of a single component. Porous carbon and aluminum oxide, porous carbon and vanadium oxide, are examples of two components. Additional components can include graphite materials that improve conductivity of the porous composite, other oxides, and the like. To fabricate the nanoporous materials with multiple components, particles of more than one kind can be mixed as additives into a liquid body containing a precursor that eventually leads to the formation of a wet gel. When the liquid is removed, the remaining solid matrix can have a porous structure including multiple components. Further modifications to the porous structure can be made when the particles are removed, for example, by etching.

SUMMARY

This specification describes technologies relating to fabricating porous materials using thixotropic materials.

In general, one innovative aspect of the invention can be embodied in a method of fabricating a porous material. A shear force is applied to a thixotropic material having substantially static properties in an absence of a shear force and having substantially fluidic properties in a presence of a shear force. The thixotropic material flows in the presence of the shear force and can become static when the shear force is no longer present. Multiple components are added to the thixotropic material while applying the shear force. The multiple materials are distributed in the thixotropic material. The shear force is removed such that the substantially static properties of the thixotropic material return in the absence of the shear force and retain a distribution of the multiple components in the thixotropic material to form a composite gel material that includes a liquid within a network of inter-connected solid particles and also includes the distributed multiple components. The liquid is removed to provide the porous matrix having a property. The liquid component in the composite gel can be removed by a process comprising drying, supercritical drying, cryogenic drying, heating, or the like. In some implementations, the heating can cause dehydration, decomposition, combustion or pyrolysis of a solid component.

This, and other aspects, can include one or more of the following features. A component of the multiple components can be removed to form another porous composite material having another property. A component of the multiple components can be removed by a process comprising etching, melting, dissolution, decomposition, evaporation, sublimation, heating, or combustion. The thixotropic material can be a wet gel comprising a liquid and an oxygen-containing compound comprising a non-metal, metal, semi-metal, metalloid, or semi-conductor. Examples of the oxygen-containing compound include alumina, chromia, iron oxide, vanadia, or clay. In some implementations, the thixotropic material can include additional components that do not form a gel. A component of the additional components comprises an inorganic particle, an organic particle, a polymer particle, a biological particle or a biomass.

A component of the multiple components comprises a monomer, a polymer, a metal, a semi-conductor, an insulator, an inorganic particle, an organic particle, a solvated molecule, a surfactant, an emulsion, a fiber, a foam, a biological material, a quantum dot, or a magnetic material. The multiple components can be pre-mixed with a liquid or a solvent before they are added to the thixotropic material. Applying the shear force to the thixotropic material can include placing the thixotropic material in a container and stirring, shaking, spinning, shearing, or vibrating the thixotropic material in the container.

Another innovative aspect of the invention can be implemented as a method including applying a shear force to a thixotropic material prepared from $AlCl_3 \cdot 6H_2O$, a solution including water and ethanol, and propylene oxide, adding a monomer solution to the thixotropic material while applying the shear force, the shear force causing the thixotropic material to exhibit substantially fluidic properties and causing the monomer solution to mix with the thixotropic material, removing the shear force, causing a mixture of the monomer solution and the thixotropic material gelate into a substantially static gel after a period of time that is sufficient to cause gelation of the mixture.

This, and other aspects, can include one or more of the following features. The thixotropic material can be prepared by performing operations including adding 14.2 g of $AlCl_3 \cdot 6H_2O$ to 90 ml of a 50/50 v/v solution of water and ethanol, mixing 37.7 g of propylene oxide to the water and ethanol solution, leaving the water and ethanol solution undisturbed for a time period. The monomer solution includes 5.2 g of resorcinol and 7.9 g of 37% formaldehyde in 30 ml of a 50/50 v/v solution of water and ethanol. Leaving the mixture of the monomer solution and the thixotropic material undisturbed for the time can cause formation of a gel. The method can further include heating the gel for three days at 76° C., and air drying the gel in atmosphere to form a xerogel. The method can further include pyrolyzing the xerogel by heating in argon at 700° C. for 1 hour.

Particular implementations of the subject matter described in this specification can be implemented to realize one or more of the following potential advantages. Using thixotropic materials to prepare porous composite materials can provide homogeneity to the distribution of the additives across the material. Also, the thixotropic materials can increase gel viscosity rapidly upon the removal of the shear force thereby retaining homogeneity. The techniques described here can decrease the need for chemical manipulation of the gel materials to achieve homogeneity of additive distribution in the porous network. Also, using these techniques, a large variety of thixotropic materials can be used to form porous materials, sometimes previously unachievable ones, through selective removal or manipulation of existing constituent materials in the porous materials. The techniques described here are also time efficient processes to prepare porous composite materials.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

FIG. 1 shows a container including an example first material that exhibits thixotropic properties.

FIG. 2 shows an example shear force applied to the example first material.

FIG. 3 shows adding example components to the sheared example first material.

FIG. 4 shows an example substantially fluidic homogeneous mixture formed in the container.

FIG. 5 shows the example substantially static composite in the container after the shear force is removed.

FIG. 6 shows the example porous composite in the container after the liquid component is removed.

FIG. 7 shows the example porous material after the optional step of removing one of the solid components.

Like reference numbers and designations in the various drawings indicate like elements.

DETAILED DESCRIPTION

Figure 8:
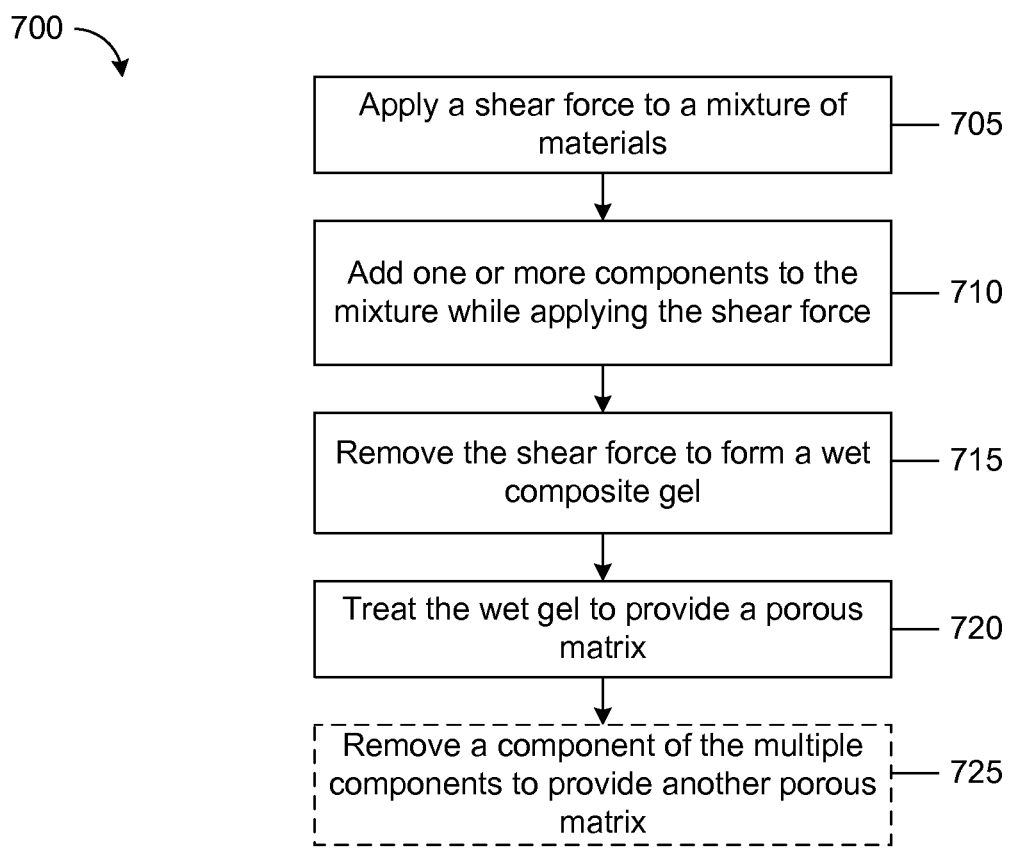
FIG. 8 is a flowchart of an example of a process for forming a porous matrix.

Methods, apparatuses, and systems for fabricating porous materials using thixotropic gels are described. Porous materials, for example, having a pore distribution in a nanometer range, can be synthesized by either a template method or a solvent removal method. In the template method, sacrificial templates can be mixed into a liquid body of the precursor that polymerizes to form a solid. Then, the templates can be removed to leave pore space in the solid body. The templates can be organic polymers, self-assemblies of surfactants, or other nanoparticulate matter. In some scenarios, the sacrificial templates can be a pre-formed bulk porous solid. In such scenarios, the porous body can be infiltrated by the liquid precursor by soaking the body in the liquid.

In the solvent removal method, a wet gel can be formed when a gel precursor and a gelation agent are mixed with a solvent. The solvent can be removed, typically by drying, leaving connected pores in the final solid product. In some scenarios, a wet gel can be prepared by mixing two or more different gel precursors and a gelation agent in a solvent. Drying the solvent can provide a porous composite material made of different compounds. The porosities and the pore morphologies of the resulting materials can be affected by the liquid removal methods which can include heating, ambient drying, supercritical drying, cryogenic drying, and the like.

In some scenarios, the sacrificial template can be a component of a wet gel, i.e., a gel in which the liquid component is not removed yet to give a porous solid body. In a wet gel, the solid component is formed by "sol" nanoparticles that are held together loosely but continuously throughout the entire body of the gel. The wet gel can be implemented as a material that contains a template or scaffold for the synthesis of further materials. The wet gel is mixed with the precursor and the precursor is polymerized. The removal of the liquid component of the product provides a porous material. In some implementations, a solid component of the product can be etched out to leave only the polymeric matrix which can have the pore network as the imprint of the nanoparticles of the wet gel.

A thixotropic material has substantially static properties in an absence of a shear force and substantially fluidic properties in a presence of the shear force. For example, the thixotropic material flows like a fluid in the presence of the shear force. The phenomenon by which the material reverts between a more viscous state and a less viscous liquid state when the magnitude of shear stress is changed is called thixotropy. Wet alumina gel is an example of a thixotropic material which liquefies in the presence of a moderate shear force and resolidifies into the gel upon removal of the force. In general, the thixotropic material is a wet gel that consists of inter-connected sol particles, made in solution, and liquid. Using a thixotropic gel as a wet gel containing template or scaffold, porous materials including porous conductive carbon monoliths, porous metal oxide composites, and hierarchically porous metal oxides and composites can be formed. A method of forming porous composite materials by mixing components in a thixotropic material is described with reference to FIGS. 1-6.

An advantage of this implementation is that the resulting pore network can be open throughout almost the entire body of the product, thereby ensuring an open porosity. In addition, the use of a material that exhibits thixotropic properties to mix the precursors, with or without additives, can increase the homogeneity of distribution of the multicomponents.

FIG. 1 shows a container including an example first material which is a thixotropic material. The first material 12 can include wet gels of alumina, iron oxide, chromia, vanadia, or clay. In some implementations, the thixotropic material can include additional components that do not form a gel. A component of the additional components comprises an inorganic particle, an organic particle, a polymer particle, a biological particle, or a biomass. The container 10 can be any container, for example, a glass beaker, a plastic jar, and the like. In some implementations, first material 12 is prepared by adding a quantity of gel precursor to a volume of solvent. To this solution, a quantity of a second material, for example, a gelation agent, is added. For example, 1.5 g of $AlCl_3 \cdot 6H_2O$ is added to 10 ml of 50/50 v/v mixture of water and ethanol. To the resulting clear solution, 3.9 g of propylene oxide is added. The mixture is stirred and allowed to gel at room temperature for an hour, thereby forming the first material 12. This art of work is described in Baumann, Theodore F.; Gash, Alexander E.; Chinn, Sarah C.; Sawvel, April M.; Maxwell, Robert S.; Satcher, Joe H., Jr. "Synthesis of High-Surface-Area Alumina Aerogels without the Use of Alkoxide Precursors." Chemistry of Materials (2005), 17(2), 395-401.

The method further includes, stirring the reaction mixture. The solution gelates, for example, upon providing sufficient time for gelation. The gelation time can be, for example, three hours. When the gel is stirred, then the gel exhibits thixotropic properties and becomes a free flowing liquid. In some implementations, small volumes of solvent can optionally be added to facilitate blending. For example, a volume of absolute ethanol, comparable to the volume lost to evaporation, is added during stirring. When the stirring is ceased and the liquid is allowed to rest, the liquid re-gels into a substantially static state in a certain time.

FIG. 2 shows an example shear force 14 applied to the example first material 12. In some implementations, a shear force 14 can be applied to the first material 12 in the container 10. To do so, a mechanical stirring device, for example, a hand-held kitchen blender, can be used. For example, the stirring device can be positioned within the first material 12 in the container 10, thereby imparting the shear force 14 directly to the material 12. Alternatively, the container 10 can be spun at an angular velocity. The shear force 14 generated on the container 10 as a consequence of the spinning can be transferred to the first material 12.

FIG. 3 shows adding example components 18 and 22 to the first material 12. In some implementations, a first component 18 held in a first container 16 can be poured into the container 10. In some implementations, a second component 22 held in a second container 20 can be poured into the container 10 as well. In other implementations, the components 18 and 22 can be pre-mixed before they are poured into the container 10. In still other implementations, more than two components can be added into the container 10. The components can include a monomer, a polymer, a metal, an inorganic particle, an organic particle, a solvated molecule, a surfactant, an emulsion, a fiber, a foam, a biological material, a quantum dot, a magnetic material, and the like, as well as any number of combinations of them. The components can be pre-mixed with a liquid or a solvent before they are added to the thixotropic material.

FIG. 4 shows the mixture of the first material 12 and the components 18 and 22 under the shear force. In some implementations, the thixotropic material is prepared by dissolving 14.2 g of $AlCl_3.6H_2O$ in 90 ml of 50/50 v/v mixture of water and ethanol. To this mixture, 37.7 g of propylene oxide is added. The mixture is stirred and allowed to gel at room temperature for an hour, thereby forming the first material 12. A shear force is applied to the first material 12 by mechanically blending the gel, for example, with a hand-held kitchen blender. During blending, a monomer solution consisting of 5.2 g of resorcinol and 7.9 g of 37% formaldehyde in 30 ml of a 50/50 v/v mixture of water and ethanol is added to the thixotropic material. The monomer solution consisting of resorcinol and formaldehyde is an example of a component (18, 22) that can be added when the shear force is applied to the first material 12. Examples of additional components that can be added to the first material 12 under the application of the shear force 14 include calcium carbonate ($CaCO_3$) particles, copper particles, carbon black particles, epoxy precursors, gibbsite, and the like.

FIG. 5 shows an example wet composite gel 24 formed in the example container 10 after the shear force is removed. In implementations in which 5.2 g of resorcinol and 7.9 g of 37% formaldehyde are added to the first material 12 and a shear force 14 is applied, the mixture in the container 10 in FIG. 4 is a light-yellow transparent free flowing liquid. The mixture becomes a wet composite gel 24 which is substantially static in a few minutes after the shear force has been removed and hardens more afterwards. As described previously, the wet gel includes inter-connected solid particles with a liquid between them, and exhibits thixotropic properties. In alternative implementations, the first material 12 can be formed by dissolving 7.4 g $AlCl_3.6H_2O$ in 45 ml of a 50/50 v/v mixture of water and ethanol, adding 17.8 g of propylene oxide to the mixture, and allowing the mixture to gel at room temperature for about an hour. Shear force is applied to the resulting mixture and a monomer solution consisting of 9.9 g of resorcinol and 15.1 g of 37% formaldehyde was added during blending. Further, 1.6 g of $CaCO_3$ is also added as the shear force was applied. The wet composite gel 24 formed within the container 10 by performing these steps re-gels quickly after the shear force is removed.

In another implementation, the wet gel 12 is made from 14.3 g of $AlCl_3.6H_2O$, 90 ml of a 50/50 v/v mixture of water and ethanol, and 35.8 g of propylene oxide. The mixture is stirred and allowed to gel at room temperature for an hour, thereby forming the wet gel 12. The monomer solution including 5.2 g of resorcinol and 7.9 g of 37% formaldehyde is added to wet gel 12 during an application of the shear force. Subsequently, 5 g of the liquid formed by the application of shear force to the wet gel 12 is mixed with 1 g of 125 mesh copper particles in a vial. The wet composite gel 24 formed within the container re-gelled into a monolithic material 24 hours after the removal of the shear force.

In another implementation, epoxy components were polymerized in situ after the formation of the wet composite gel 24, which occurred after the removal of the shear force. The wet gel 12 was formed using 2.96 g of $AlCl_3.6H_2O$, 15.88 g of absolute ethanol, 2 g of water, and 7.86 g of propylene oxide. The mixture is stirred and allowed to gel at room temperature for an hour, thereby forming the wet gel 12. When the solution is stirred and poured into a plastic mold, the solution gels quickly, for example, in three minutes. Under the application of a shear force, epoxy components, for example, 305A and 305B (procured from Epoxy Technologies, Billerica, Mass.), are added in a volume ratio of 2:1:1. The resulting wet composite gel 24 in the container 10 forms 20 hours after the removal of the shear force and has the appearance of a translucent yellow rubbery mass.

In another implementation, a preformed polymer of poly (propylene carbonate) was blended with the wet gel 12 to form wet gel composite 24. The wet gel 12 was formed using 7.1 g $AlCl_3$ dissolved in 39 g of 50/50 v/v mixture of water and ethanol, and 17.1 g of propylene oxide. The mixture is stirred and allowed to gel at room temperature for an hour, thereby forming the wet gel 12. After gelation, shear force was applied to the resulting mixture and a monomer solution consisting of 1 g of resorcinol and 1.5 g of 37% formaldehyde dissolved in 16 g of 50/50 v/v water and ethanol was added during blending. Further, a 5 mL portion of a solution consisting of 1 g QPAC-40 poly(propylene carbonate) (Empower Materials, New Castle, Del.) in 10 g of acetone was also added as the shear force was applied. The wet composite gel 24 formed within the container 10 by performing these steps re-gels quickly after the shear force is removed. The wet composite was left for about one day at room temperature, then placed in an oven at 70° C. for about one day. This produced a translucent red composite gel, which was air dried for five days. After drying, very small clear colorless spherical particles could be seen on the surface of the composite that were flexible and deformable.

In another implementation, the wet gel 12 contained hollow glass microspheres. 7.1 g of $AlCl_3$ was dissolved in 39 g of 50/50 v/v mixture of water and ethanol. 0.5 g of approximately 70 μm hollow glass microspheres (Fibre Glast, Brookville, Ohio) were also mixed in and 17.1 g of propylene oxide was added. After the wet gel 12 formed in about an hour, most of the hollow glass microspheres were located at the top of the gel due to their buoyancy. After gelation, shear force was applied to the resulting mixture and a monomer solution consisting of 1.0 g of resorcinol and 1.6 g of 37% formaldehyde dissolved in 16 g of 50/50 v/v water and ethanol was added during blending. The hollow glass microspheres became homogeneously distributed in the wet gel. The wet composite was left at room temperature for about three days, and then placed in an oven for about one day at 70° C. The wet composite was then air dried at room temperature for one day, and oven dried at 70° C. for one day. The resulting dried composite gel was then heated to 110° C. at 2° C./min and held for one hour, all under flowing Argon, followed by heating to 700° C. at 6° C./min and holding for one hour, all under flowing Argon. Some of the pyrolyzed composite was then placed in 10 M NaOH solution and stirred for several days. After the NaOH treatment, the glass microspheres were absent from the surface regions as evidenced by the spherical voids along the surface.

In another implementation, the wet gel 12 is prepared using aluminum hydroxide, $Al(OH)_3$. To prepare the wet gel 12, gibbsite (2.2 g) is dissolved in a solution of 10 g of water and 7 g of concentrated hydrochloric acid (HCl). In this solution 5 g of urea was dissolved. The solution was allowed to gel in an oven at 85° C. for two days to form a thixotropic wet gel 12 having the appearance of a hard translucent gel, thereby forming the wet gel 12. When the wet gel 12 was allowed to rest for one day after applying a shear force 14, the gel was in a substantially static state.

FIG. 6 shows an example porous composite material 25 formed after the removal of liquid by a treatment comprising drying, supercritical drying, cryogenic drying, heating, or the like. In some implementations, the heating can cause dehydration, decomposition, combustion or pyrolysis of a part of the composite 25.

If the treatment requires a large amount of heat, the container can be replaced by a thermally resistant container such as silica and alumina. To form the porous composite 25, for example, the wet composite gel 24 was air dried in atmosphere to form a dried gel. The composite was then pyrolyzed by heating in argon at 700° C. for 1 hour.

FIG. 7 shows an example porous composite material 26 after an additional optional treatment in which one or more components of porous composite 25, formed by the processes described above, is removed. In implementations in which copper particles are added to form the porous composite 25, one or more of the original components can be removed, for example, through dissolution or decomposition. For example, the copper particles can be dissolved by immersion of the porous composite 25 in a solution of 50 ml $H_2O$, 1.86 g ethylenediaminetetraacetic acid (EDTA), 0.5 g of hydrogen peroxide ($H_2O_2$) heated to 50° C. on a hot plate for several days. Alternatively, the copper particles can be dissolved by soaking the porous composite 25 in a 7M solution of nitric acid ($HNO_3$) for several days. The resulting porous material exhibited moderate electrical resistance.

In another implementation, carbon black (diameter ~40 nm) was added to the wet gel 12 with shear force, followed by a drying treatment to form a porous composite 25 that consists of carbonaceous materials and alumina. Porous carbon can be prepared by dissolving the alumina by immersion in 10 M sodium hydroxide (NaOH) solution for three days. The base solution dissolves the alumina component to leave only the carbonaceous material.

FIG. 8 is a flowchart of an example process 700 for forming a porous matrix. The process 700 applies a shear force to a mixture of materials at 705. The process 700 adds one or more components to the mixture while applying the shear force at 710. The process 700 removes the shear force to form a wet composite gel at 715. The process 700 treats the wet composite gel to provide a porous matrix at 720. Optionally, the process 700 removes a component of the porous matrix to provide another porous matrix at 725.

Figure 9A:
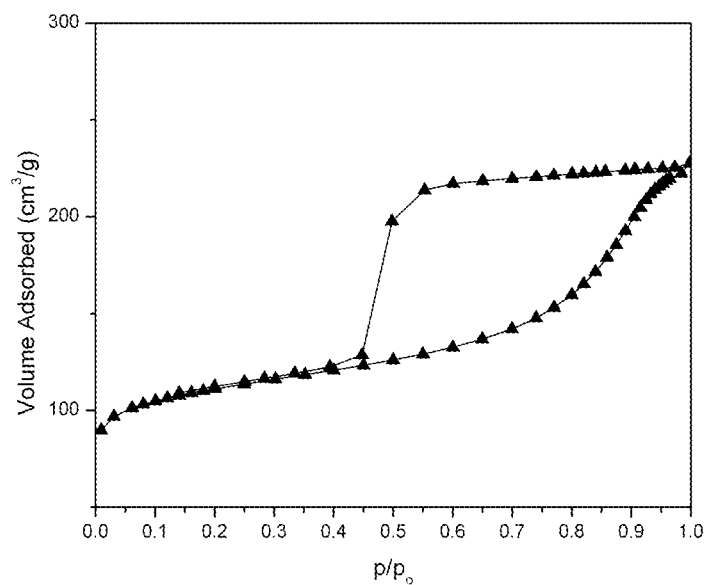
FIGS. 9A and 9B show nitrogen ($N_2$) sorption-desorption isotherm and BJH pore size distribution of an example air-dried composite porous matrix.
Figure 9B:
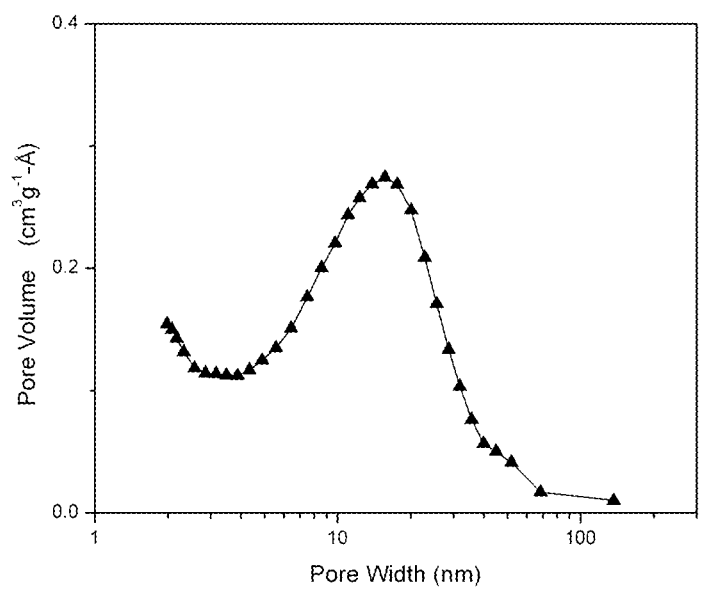

FIGS. 9A and 9B show nitrogen ($N_2$) sorption-desorption isotherm and pore size distribution of an example air-dried composite porous matrix consisting of porous carbon and porous alumina. BET analysis of this data generates a calculated surface area of 380 $m^2/g$. The application of the BJH method to the adsorption branch of the collected data in FIG. 9A produces the dV/d log(D) Pore Volume graph in FIG. 9B. The adsorption branch shows a specific pore volume of 0.35 $cm^3/g$ and an average pore width of 3.7 nm (4V/A).

Figure 10A:
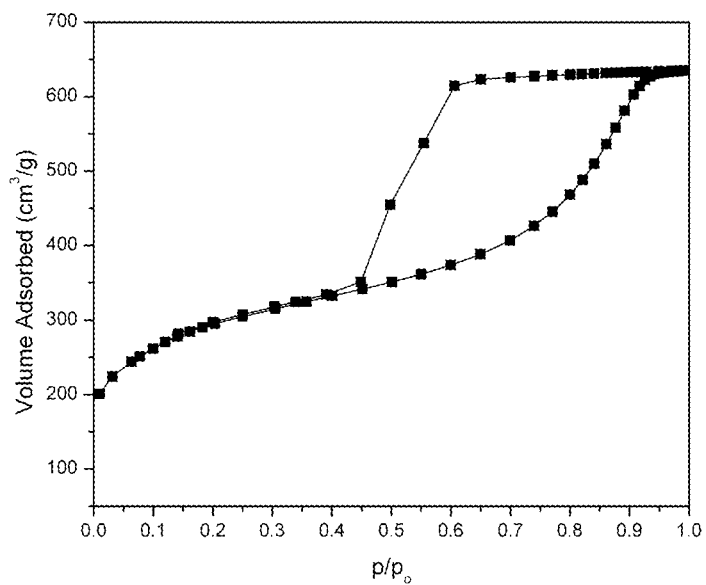
FIGS. 10A and 10B show nitrogen ($N_2$) sorption-desorption isotherm and BJH pore size distribution of an example air-dried composite porous matrix from which a component has been removed.
Figure 10B:
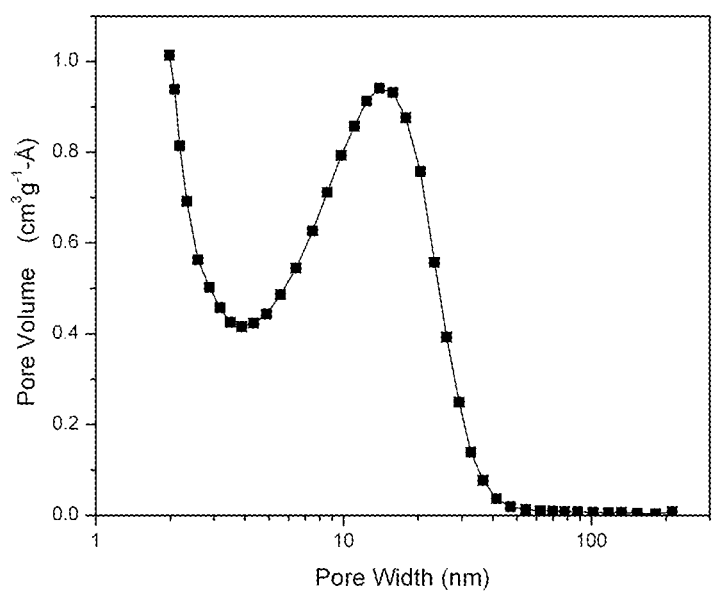

FIGS. 10A and 10B show nitrogen ($N_2$) sorption-desorption isotherm and pore size distribution of an example air-dried composite porous matrix with the alumina component removed. BET analysis of this data generates a calculated surface area of 1057 $m^2/g$. The application of the BJH method to the adsorption branch of the collected data in FIG. 10A produces the dV/d log(D) Pore Volume graph in FIG. 10B. The adsorption branch shows a specific pore volume of 0.98 $cm^3/g$ and an average pore width of 3.7 nm (4V/A).

Figure 11A:
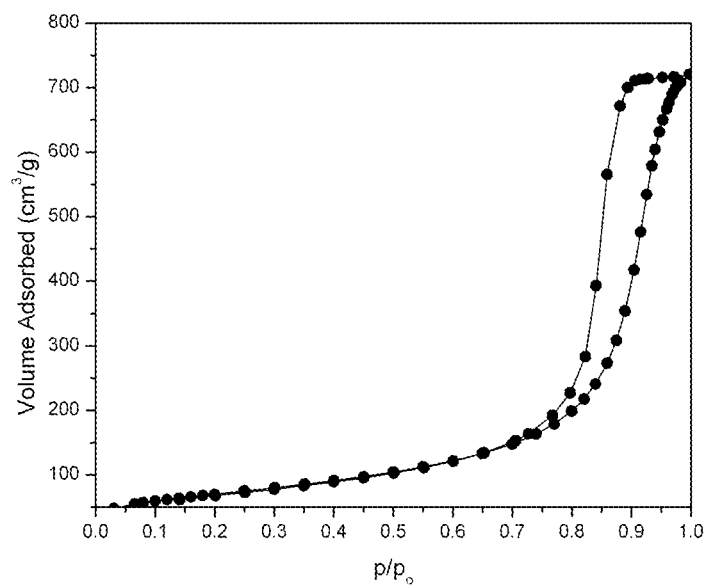
FIGS. 11A and 11B show nitrogen ($N_2$) sorption-desorption isotherm and BJH pore size distribution of an example air-dried composite porous matrix from which a different component has been removed.
Figure 11B:
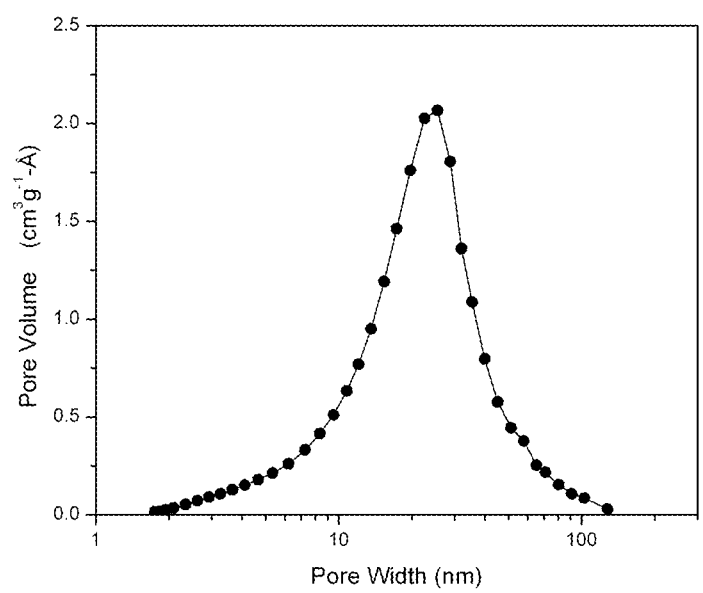

FIGS. 11A and 11B show nitrogen ($N_2$) sorption-desorption isotherm and pore size distribution of an example air-dried composite porous matrix from which the carbon component has been removed. BET analysis of this data generates a calculated surface area of 253 $m^2/g$. The application of the BJH method to the adsorption branch of the collected data in FIG. 11A produces the dV/d log(D) Pore Volume graph in FIG. 11B. The adsorption branch shows a specific pore volume of 1.1 $cm^3/g$ and an average pore width of 18 nm (4V/A).

Figure 12A:
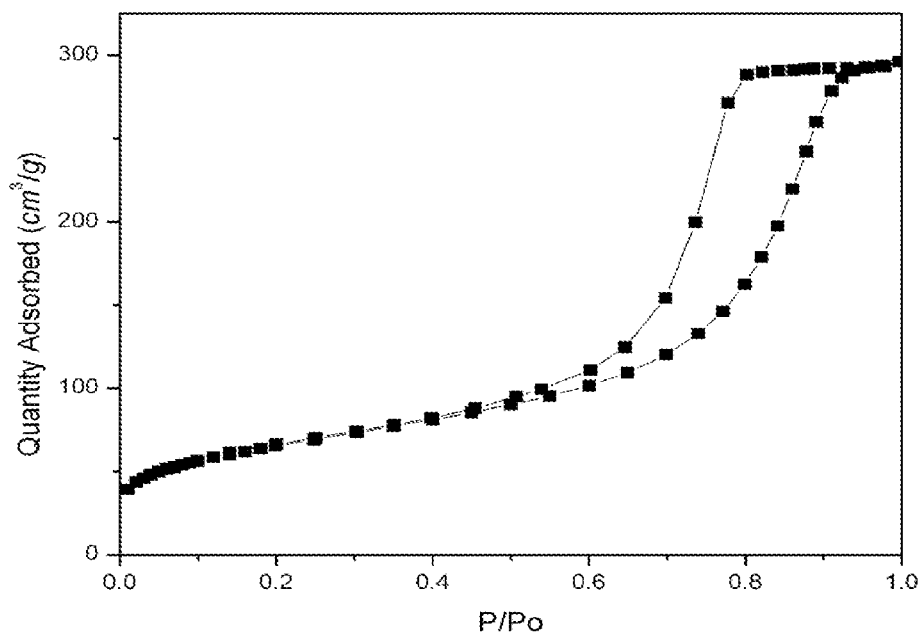
FIGS. 12A and 12B show nitrogen ($N_2$) sorption-desorption isotherm and BJH pore size distribution of an example air-dried composite porous matrix that included hollow glass microspheres prior to thixotropic gel formation.
Figure 12B:
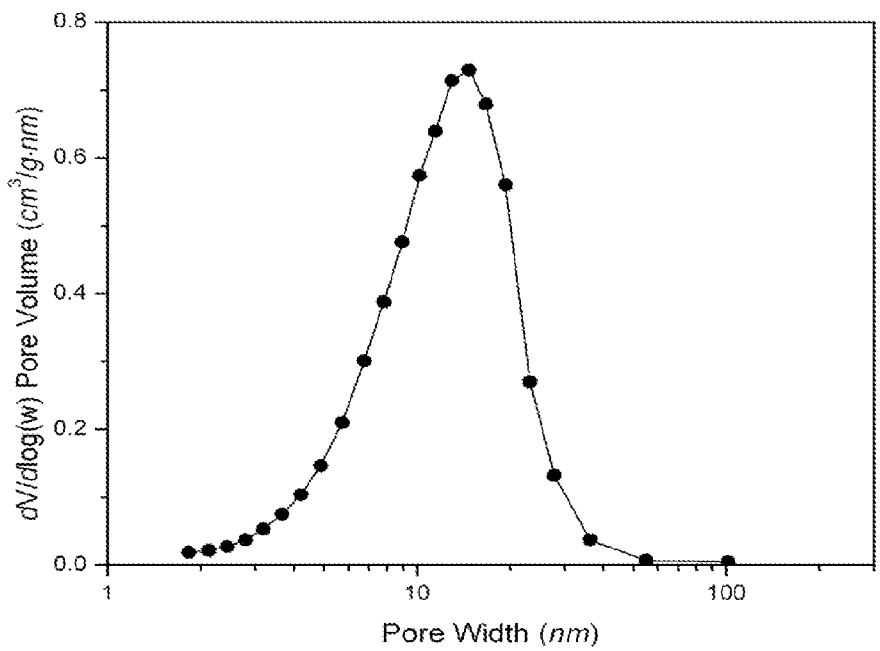

FIGS. 12A and 12B show nitrogen ($N_2$) sorption-desorption isotherm and pore size distribution of an example air-dried composite porous matrix consisting of porous carbon, porous alumina, and also glass microspheres that were included in the mixture prior to thixotropic gel formation. BET analysis of this data generates a calculated surface area of 235 $m^2/g$. The application of the BJH method to the adsorption branch of the collected data in FIG. 12A produces the dV/d log(D) Pore Volume graph in FIG. 12B. The adsorption branch shows a specific pore volume of 0.45 $cm^3/g$ and an average pore width of 7.7 nm (4V/A).

Figure 13A:
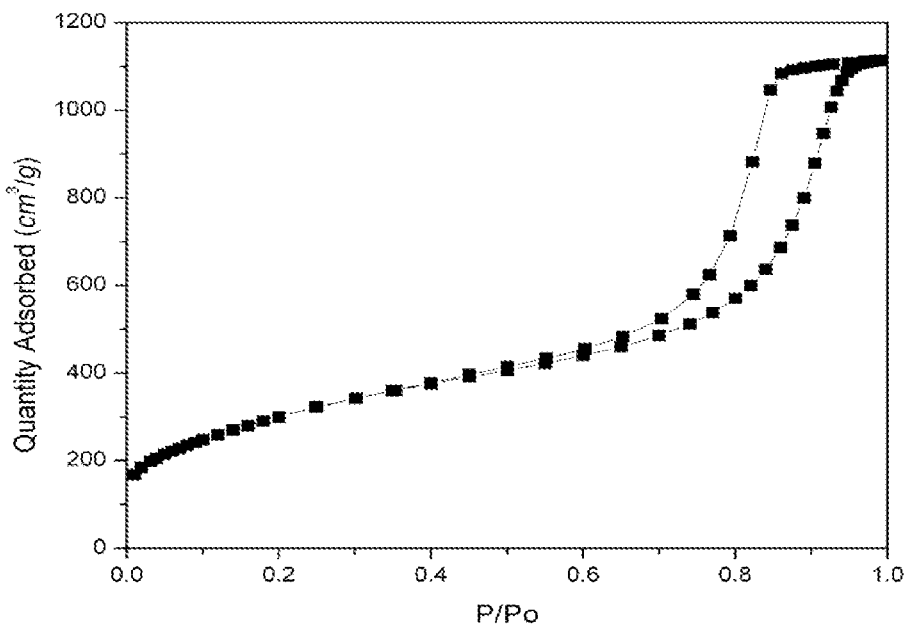
FIGS. 13A and 13B show nitrogen ($N_2$) sorption-desorption isotherm and BJH pore size distribution of an example air-dried composite porous matrix that included hollow glass microspheres prior to thixotropic gel formation, and subsequently had all non-carbonaceous components removed.
Figure 13B:
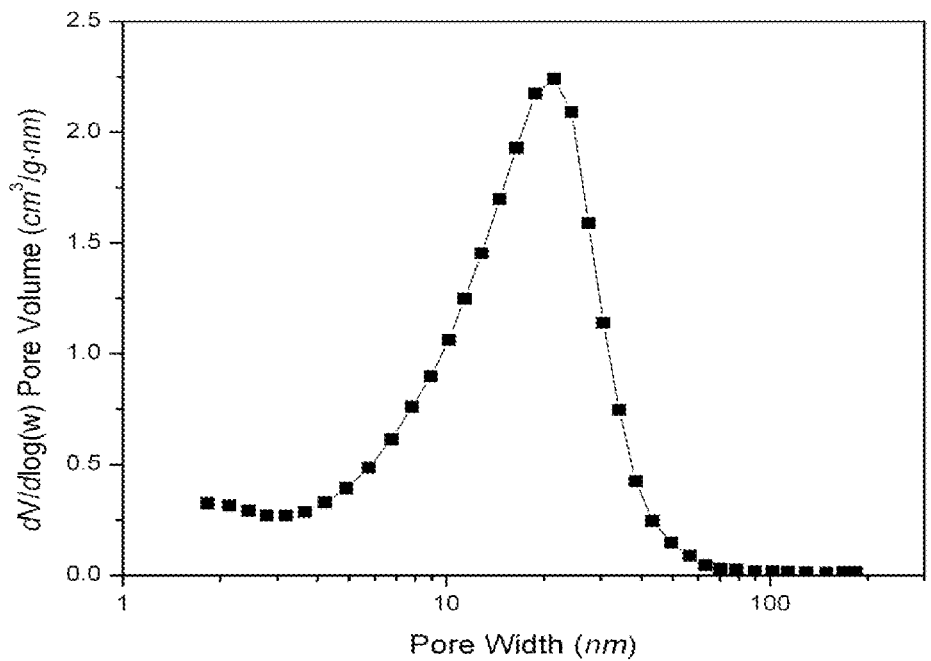

FIGS. 13A and 13B show nitrogen ($N_2$) sorption-desorption isotherm and pore size distribution of an example air-dried composite porous matrix where hollow glass microspheres were included in the mixture prior to thixotropic gel formation and all non-carbon components were removed. The hollow glass microspheres were removed by soaking in 10 M NaOH solution for several days. The alumina component was removed by hydrothermal treatment with 32 wt % of $H_2SO_4$ in a Parr bomb at 160° C. for about 24 hours. BET analysis of this data generates a calculated surface area of 1103 $m^2/g$. The application of the BJH method to the adsorption branch of the collected data in FIG. 13A produces the dV/d log(D) Pore Volume graph in FIG. 13B. The adsorption branch shows a specific pore volume of 1.7 $cm^3/g$ and an average pore width of 6.2 nm (4V/A).

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations. Thus, particular implementations of the specification have been described. Other implementations are within the scope of the following claims. For example, the actions recited in the claims can be performed in a different order and still achieve desirable results.

An example of a material formed by the above-described processes includes carbon composites that can be applied in batteries and super-capacitors. Other materials include nanoporous matrices for applications including, but not limited to, as adsorbents, absorbents, nano-containers, nano-reactors, catalysts, catalyst supports, separations, gas/liquid/fuel storage materials, electrodes, sensors, solar energy collectors, solar cell components, dielectrics, and active battery components.

Only a few implementations are described and illustrated. Variations, enhancements and improvements of the described implementations and other implementations can be made based on what is described and illustrated in this document.

What is claimed is:

1. A method of fabricating a porous material, the method comprising:
    applying a shear force to a thixotropic wet gel to yield a thixotropic fluid;
    adding a plurality of components to the thixotropic fluid while applying the shear force, thereby distributing the plurality of components in the thixotropic fluid;
    removing the shear force from the thixotropic fluid in which the plurality of components is distributed to yield a composite gel in which the plurality of components is distributed; and
    treating the composite gel to yield a porous material.

2. The method of claim 1, wherein the thixotropic wet gel comprises a liquid and an oxygen-containing compound, the oxygen-containing compound comprising one of a metal, semi-metal, metalloid, or semi-conductor.

3. The method of claim 2, wherein the thixotropic wet gel further comprises a second plurality of components that do not form a gel.

4. The method of claim 2, wherein the thixotropic wet gel further comprises inorganic particles, organic particles, a polymer particles, a biological particles, biomass, or a combination thereof.

5. The method of claim 1, wherein the thixotropic wet gel comprises a liquid and organic gelating particles.

6. The method of claim 5, wherein the organic gelating particles are pre-mixed with the liquid or a solvent.

7. The method of claim 5, wherein the thixotropic wet gel further comprises a second plurality of components that do not form a gel.

8. The method of claim 5, wherein the thixotropic wet gel further comprises inorganic particles, organic particles, a polymer particles, a biological particles, biomass, or a combination thereof.

9. The method of claim 1, wherein a component of the plurality of components comprises a monomer, a polymer, a metal, an inorganic particle, an organic particle, a solvated molecule, a surfactant, an emulsion, a fiber, a foam, a biological material, a quantum dot, a magnetic material, or a combination thereof.

10. The method of claim 1, wherein applying the shear force to the thixotropic wet gel comprises:
    placing the thixotropic wet gel in a container; and
    stirring the thixotropic wet gel in the container.

11. The method of claim 1, wherein applying the shear force to the thixotropic wet gel comprises:
    placing the thixotropic wet gel in a container; and
    shaking or shearing the thixotropic wet gel in the container.

12. The method of claim 1, wherein applying the shear force to the thixotropic wet gel comprises:
    placing the thixotropic wet gel in a container; and
    spinning or vibrating the container.

13. The method of claim 1, wherein a component of the plurality of components in the composite gel is removed by a process comprising etching, melting, dissolution, decomposition, evaporation, sublimation, heating, or combustion.

14. A method comprising:
    applying a shear force to a thixotropic wet gel to yield a thixotropic fluid, wherein the thixotropic wet gel is prepared from $AlCl_3.6H_2O$, a solution including water and ethanol, and propylene oxide;
    adding a monomer solution to the thixotropic fluid while applying the shear force, thereby mixing the monomer solution with the thixotropic fluid to yield a composite thixotropic fluid;
    removing the shear force from the composite thixotropic fluid; and
    gelling the composite thixotropic fluid to yield a porous matrix.

15. A method comprising:
    applying a shear force to a thixotropic wet gel to yield a thixotropic fluid, wherein the thixotropic wet gel is prepared from $Al(OH)_3$, a solution including water and hydrochloric acid, and urea;
    adding a monomer solution to the thixotropic fluid while applying the shear force, thereby mixing the monomer solution with the thixotropic fluid to yield a composite thixotropic fluid;
    removing the shear force from the composite thixotropic fluid; and
    gelling the composite thixotropic fluid to yield a porous matrix.

16. The method of claim 1, wherein the porous material is in the form of monoliths.

17. The method of claim 1, wherein the porous material is in the form of films, plates, or coatings.

18. The method of claim 1, wherein the porous material is in the form of powder or particulates.

19. The method of claim 1, further comprising using the porous materials as a reactant or component to form a new material.

20. A porous material formed by the method of claim 1.

* * * * *